United States Patent [19]
Yoshioka et al.

[11] Patent Number: 5,327,983
[45] Date of Patent: Jul. 12, 1994

[54] SUSPENSION SYSTEM FOR VEHICLE

[75] Inventors: Tohru Yoshioka; Tetsuro Butsuen; Yasunori Yamamoto, all of Hiroshima, Japan

[73] Assignee: Mazda Motor Corporation, Hiroshima, Japan

[21] Appl. No.: 833,931

[22] Filed: Feb. 11, 1992

[30] Foreign Application Priority Data

Feb. 14, 1991 [JP] Japan .................. 3-20782

[51] Int. Cl.[5] ............................. B60G 17/00
[52] U.S. Cl. ...................... 180/41; 280/707
[58] Field of Search .......... 180/41; 280/707, 840

[56] References Cited

U.S. PATENT DOCUMENTS

| | | | |
|---|---|---|---|
| 4,909,536 | 3/1990 | Hale | 180/41 X |
| 4,927,170 | 5/1990 | Wada | 180/41 X |
| 5,004,080 | 4/1991 | Wada . | |

FOREIGN PATENT DOCUMENTS 4012680 10/1990 Fed. Rep. of Germany .
60-248419 12/1985 Japan .

OTHER PUBLICATIONS

Wolfram Zylka, *Positionieren mit Schrittmotoren*, Elektrische Ausrüstung, No. 4, Aug. 1976, pp. 18–21.

*Primary Examiner*—Joseph D. Pape
*Attorney, Agent, or Firm*—Keck, Mahin & Cate

[57] ABSTRACT

A suspension system for a vehicle has shock absorbers, each provided so as to be associated with one wheel and between sprung parts and unsprung parts, step motors, each being adapted for changing damping force characteristics of one of the shock absorbers by open loop control, and a controller for outputting control signals to the step motors. The controller is adapted for outputting control signals every predetermined time interval so as to make the damping force characteristics of the shock absorbers harder. According to the thus constituted suspension system for a vehicle, it is possible to prevent the driving stability from being lowered even when at least one of the step motors is thrown out of synchronism.

7 Claims, 10 Drawing Sheets

SUSPENSION SYSTEM FOR VEHICLE

BACKGROUND OF THE INVENTION

The present invention relates to a suspension system for a vehicle and, in particular, to such a system having, between sprung parts, and unsprung parts shock absorbers having variable damping force characteristics.

DESCRIPTION OF RELATED ART

In a conventional suspension apparatus for a vehicle, shock absorbers are normally provided between vehicle body side parts, namely, sprung parts and wheel side parts, namely, unsprung parts for damping vertical vibration of the wheels.

In shock absorbers of this kind, the damping force characteristics may be variable between two stages, three or more stages, or infinitely and continuously.

In this kind of shock absorber, the damping force characteristics are normally controlled for improving riding comfort and driving stability simultaneously in such a manner that when a damping force produced by the shock absorber excites vertical vibration of the vehicle body, the damping force of the shock absorber is changed to a softer stage so as to produce lower damping force and when the damping force produced by the shock absorber damps vertical vibration, the damping force of the shock absorber is changed to a harder stage so as to produce greater damping force, thereby making damping energy larger than the excitation energy transmitted to the sprung parts.

Japanese Patent Disclosure No. Sho 60-248419 discloses a method for controlling the damping force characteristics in which it is judged that when the direction of the relative displacement between the sprung parts and the unsprung parts and the direction of the relative speed between the sprung parts and the unsprung parts coincide with each other, the damping force is exciting the vertical vibration, and when they do not coincide with each other, the damping force is damping the vertical vibration.

In the shock absorber in which the damping force is controlled based upon whether or not the direction of the relative displacement between the sprung parts and the unsprung parts and the direction of the relative speed between the sprung parts and the unsprung parts coincide with each other, when the damping force is controlled by feedback control using a computer, it inevitably becomes necessary to use a large and expensive computer because of the high frequency at which the two directions move in and out of coincidence.

It might be thought possible to solve this problem by using a step motor for controlling the damping force of the shock absorber in accordance with open loop control.

However, when a step motor is used, since the direction of the relative displacement between the sprung parts and the unsprung parts and the direction of the relative speed between the sprung parts and the unsprung parts frequently move in and out of coincidence, the step motor has to be actuated for changing the damping force characteristics from a particular stage to a harder stage and then from the harder stage to a softer stage at an extremely high speed. As a result, the step motor is thrown out of synchronism, namely, the step motors is moved to and stopped at a different step expected by a computer, whereby the damping force of the shock absorber cannot be controlled in a desired manner in accordance with the vertical vibration of the vehicle body and driving stability is lowered.

SUMMARY OF THE INVENTION

It is, therefore, an object of the present invention to provide a suspension system for a vehicle which can prevent driving stability from being lowered even when at least one step motor is thrown out of synchronism.

The above and other objects of the present invention can be accomplished by a suspension system for a vehicle having shock absorbers, each provided so as to be associated with one wheel and provided between sprung parts and unsprung parts, step motors, each being adapted for changing damping force characteristics of one of the shock absorbers by open loop control, and control means for outputting control signals to the step motors, said control means being adapted for outputting control signals every predetermined time interval so as to make the damping force characteristics of said shock absorbers harder.

The above and other objects of the present invention can be also accomplished by a suspension system for a vehicle having shock absorbers, each provided so as to be associated with one wheel and provided between sprung parts and unsprung parts, step motors, each being adapted for changing damping force characteristics of one of the shock absorbers by open loop control, and control means for outputting control signals to the step motors, said control means being adapted for outputting control signals so as to make the damping force characteristics of said shock absorbers harder when the damping force characteristics of said shock absorbers have been changed between soft stages and hard stages a predetermined number of times or more.

In a preferred aspect of the present invention, the control means is adapted for outputting control signals so as to make the damping force characteristics of said shock absorbers harder every predetermined time interval and when the damping force characteristics of said shock absorbers have been changed between soft stages and hard stages a predetermined number of times or more.

In another preferred aspect of the present invention, the control means outputs control signals so as to change the damping force characteristics of the shock absorbers associated with right and left wheels when the damping force characteristics are made harder.

In a further preferred aspect of the present invention, the control means outputs control signals so as to change the damping force characteristics of the shock absorbers associated with front wheels when the damping force characteristics of the shock absorbers associated with rear wheels are made harder.

The above and other objects and features of the present invention will become apparent from the following description made with reference to the accompanying drawings.

DESCRIPTION OF THE PREFERRED EMBODIMENT

Figure 1:
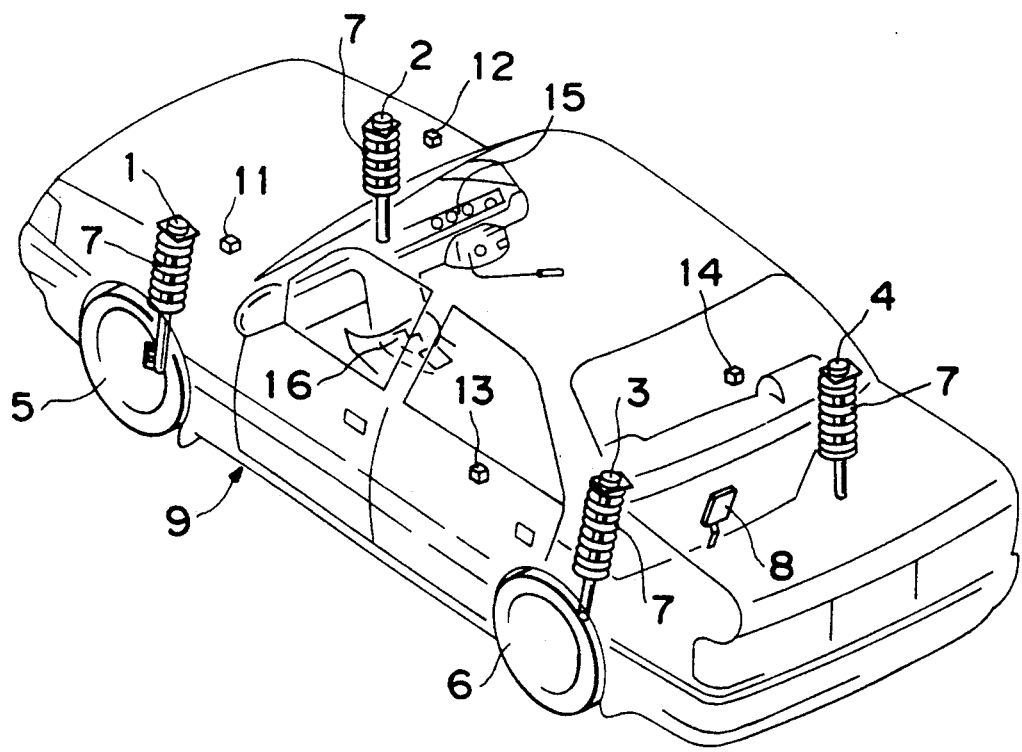
FIG. 1 is a schematic drawing showing a perspective view of a vehicle including a suspension system for a vehicle which is an embodiment of the present invention.

Referring to FIG. 1, a suspension system for a vehicle 9 which is an embodiment of the present invention comprises shock absorbers 1, 2, 3, 4 which are associated with respective wheels and adapted to damp the vertical vibration of the wheels. Each of the shock absorbers 1, 2, 3, 4 has a pressure sensor (not shown) and is constituted so that one of ten damping force characteristics each having a different damping coefficient from the others can be selected by an actuator (not shown). In FIG. 1, the reference numeral 5 designates a front left wheel and the reference numeral 6 designates a rear left wheel. The front right wheel and rear right wheel are not shown. The reference numeral 7 designates coil springs each provided on the outer circumference of the upper portion of one of the shock absorbers 1, 2, 3, 4 and the reference numeral 8 designates a control unit for outputting control signals to the actuators of the shock absorbers 1, 2, 3, 4 thereby controlling the damping force characteristics thereof.

On the sprung body of the vehicle 9 are provided a first acceleration sensor 11, a second acceleration sensor 12, a third acceleration sensor 13 and a fourth acceleration sensor 14 each detecting the vertical acceleration of the sprung parts of one of the wheels. A vehicle speed sensor 15 for detecting the vehicle speed is provided in a meter of an instrument panel. The reference numeral 16 designates a mode selection switch by which the driver can select a hard mode, a soft mode or a control mode. When the hard mode is selected, only predetermined hard damping coefficients which cause the damping force characteristics to be hard can be selected and the damping force characteristics of the shock absorbers 1, 2, 3, 4 are controlled by selecting one of the hard damping coefficients. When the soft mode is selected, only predetermined soft damping coefficients which cause the damping force characteristics to be soft can be selected and the damping force characteristics of the shock absorbers 1, 2, 3, 4 are controlled by selecting one of the soft damping coefficients. On the contrary, when the control mode is selected, the damping force characteristics of the shock absorbers 1, 2, 3, 4 are controlled in accordance with a map or table stored in the control unit.

Figure 2:
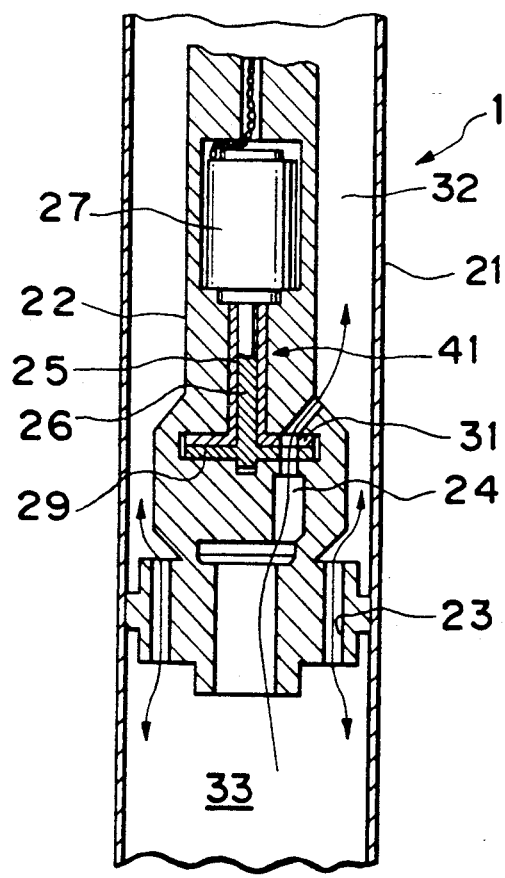
FIG. 2 is a schematic drawing showing a cross-sectional view of a part of a shock absorber associated with a front left wheel.

FIG. 2 is a schematic drawing showing a cross-sectional view of a part of the shock absorber associated with the front left wheel. However, the pressure sensor is omitted.

In FIG. 2, the shock absorber 1 comprises a cylinder 21 in which a piston unit 22 is formed by integrating a piston and a piston rod is fitted so as to slide therein. The cylinder 21 and the piston unit 22 are connected to the sprung parts and unsprung parts.

The piston unit 22 is formed with two orifices 23, 24. One of the orifices 23 is always opened and the other orifice 24 is formed so that the open area thereof can be changed by a first actuator 41 in ten stages.

Figure 3:
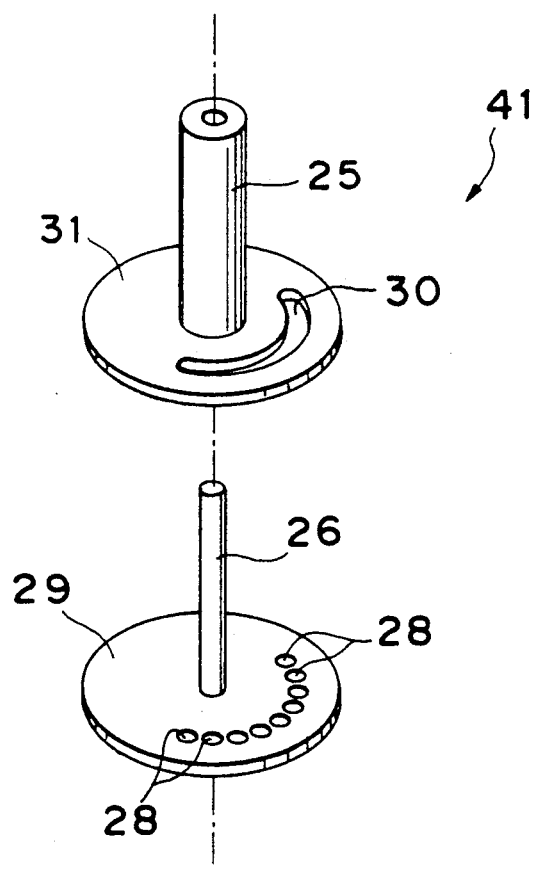
FIG. 3 is a schematic drawing showing an exploded perspective view of a first actuator associated with the shock absorber.

FIG. 3 is a schematic drawing showing a exploded perspective view of the first actuator 41 associated with the shock absorber 1.

Referring to FIGS. 2 and 3, the first actuator 41 comprises a shaft 26 rotatably provided within a sleeve 25 fixed to the piston unit 22, a step motor 27 for rotating the shaft 26, a first orifice plate 29 fixed to the lower end portion of the shaft 26 and having nine circular holes 28 along its circumference and a second orifice plate 31 fixed to the lower end portion of the sleeve 25 and formed with an arc-shaped slot 30 along its circumference thereof. The nine circular holes 28 and the arc-shaped slot 30 are formed so that 0 to 9 circular holes 28 can selectively communicate with the arc-shaped slot 30.

An upper chamber 32 and a lower chamber 33 in the cylinder 21 are filled with fluid of a predetermined viscosity which can move between the upper chamber 32 and the lower chamber 33 through the orifices 23, 24.

In FIGS. 2 and 3, although only the structure of the shock absorber 1 associated with the front left wheel is shown, the shock absorbers 2, 3, 4 associated with other wheels have the same structure as that of the shock absorber 1 shown in FIG. 2 and respectively have a second actuator 42, a third actuator 43 and a fourth actuator 44, the structures of which are same as that of the first actuator 41 shown in FIG. 3.

Figure 4:
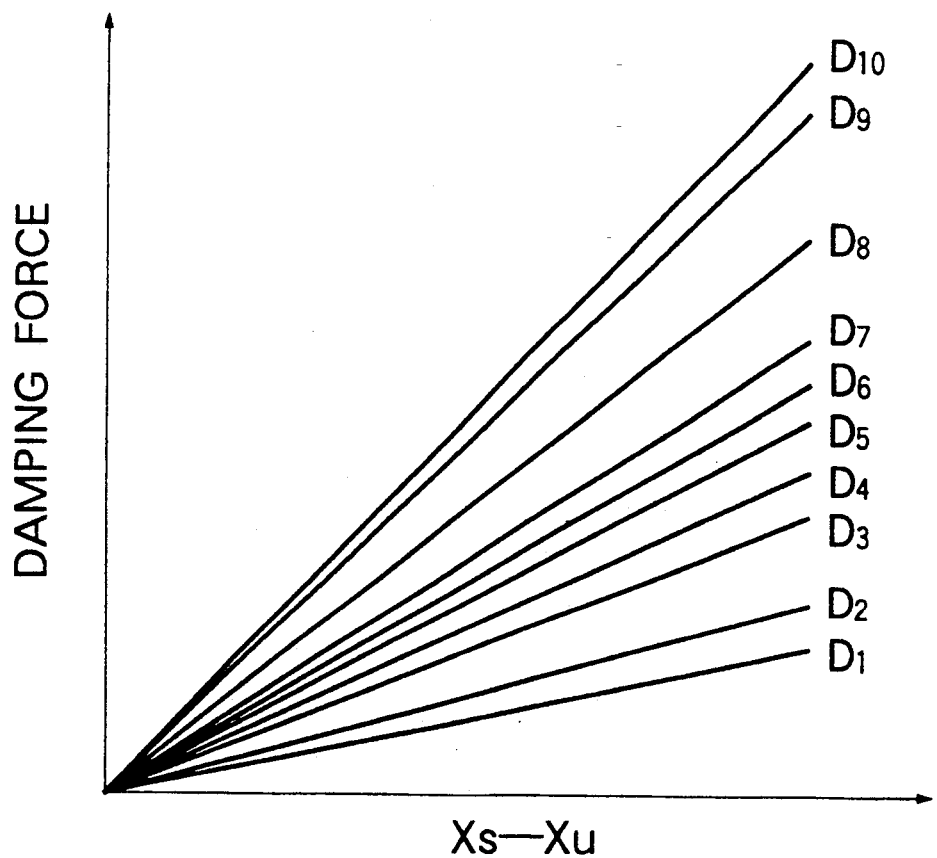
FIG. 4 is a graph showing the damping force characteristics of shock absorbers.

FIG. 4 is a graph showing the damping force characteristics of the shock absorbers 1, 2, 3, 4.

Referring to FIG. 4, D1 to D10 show damping coefficients of the shock absorbers 1, 2, 3, 4. The damping force produced by the shock absorbers 1, 2, 3, 4 is represented on the ordinate and the difference between the displacement speed of the sprung parts Xs and the displacement speed of the unsprung parts Xu, namely, the relative displacement speed (Xs−Xu), is represented on the abscissa. As shown in FIG. 4, one of ten damping force characteristics of the shock absorbers 1, 2, 3, 4 can be selected by choosing one of the damping coefficients D1 to D10. In FIG. 4, the damping coefficient D1 produces the softest damping force and the damping coefficient D10 produces the hardest damping force. The damping coefficient Dk (k being 1 to 10) is selected when (10−k) circular hole(s) 28 formed in the first orifice plate 29 communicate with the slot 30 formed in the second orifice plate 31. Therefore, the damping coefficient D1 is selected when all of the nine circular holes 28 formed in the first orifice plate 29 communicate with the slot 30 formed in the second orifice plate 31 and the damping force D10 is selected when no circular hole 28 communicates with the slot 30.

Figure 5:
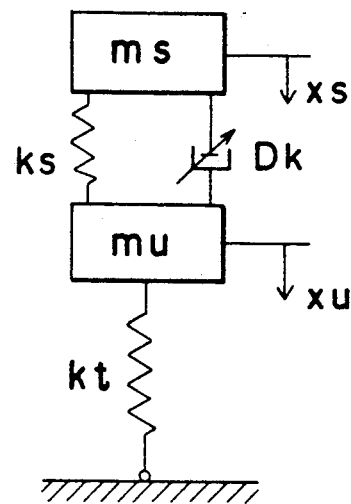
FIG. 5 is a drawing showing the vibration model of the suspension system for a vehicle which is an embodiment of the present invention.

FIG. 5 is a drawing showing the vibration model of the suspension apparatus for a vehicle which is an embodiment of the present invention. In FIG. 5, "ms" represents the mass of the sprung parts, "mu" the mass of the unsprung parts, "xs" the displacement of the sprung parts, "xu" the displacement of the unsprung parts, "ks" the spring coefficient of the coil spring 7, "kt" the spring coefficient of a tire and Dk the damping coefficient of the shock absorbers 1, 2, 3, 4.

Figure 6:
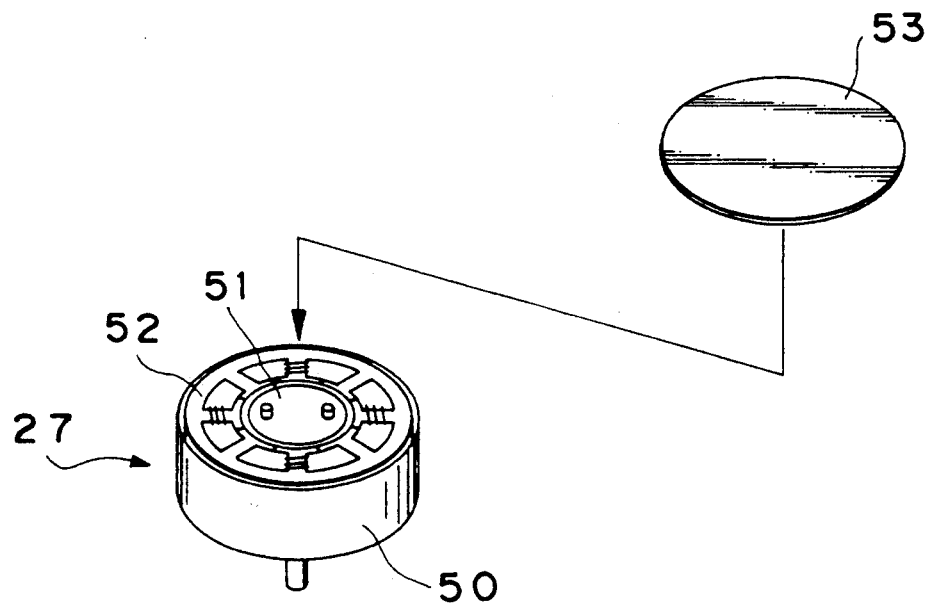
FIG. 6 is a schematic drawing showing a perspective view of a step motor.

FIG. 6 is a perspective view of the step motor 27. Referring to FIG. 6, the step motor 27 comprises a cylinder 50, a rotor 51 and a stator 52 accommodated in the cylinder 50, and a lid 53.

Figure 7:
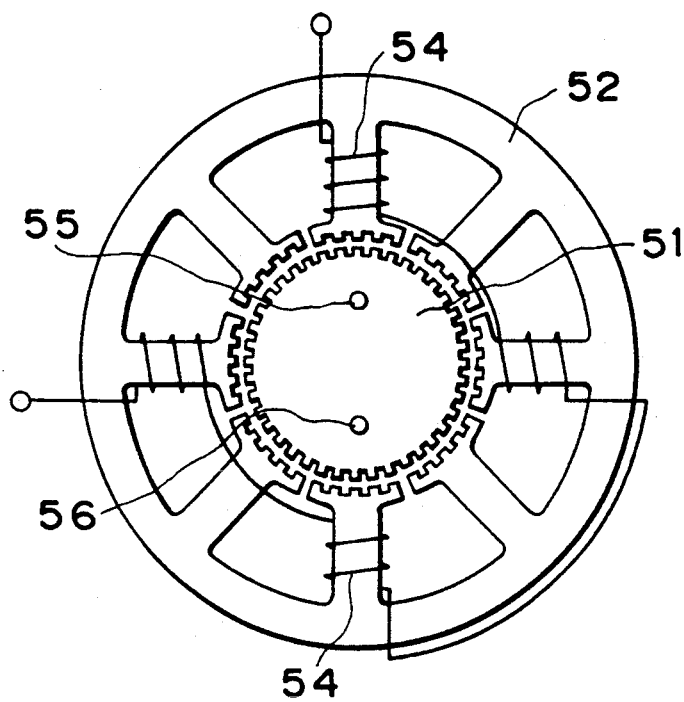
FIG. 7 is a schematic drawing showing a plan view of a rotor and a stator.
Figure 8:
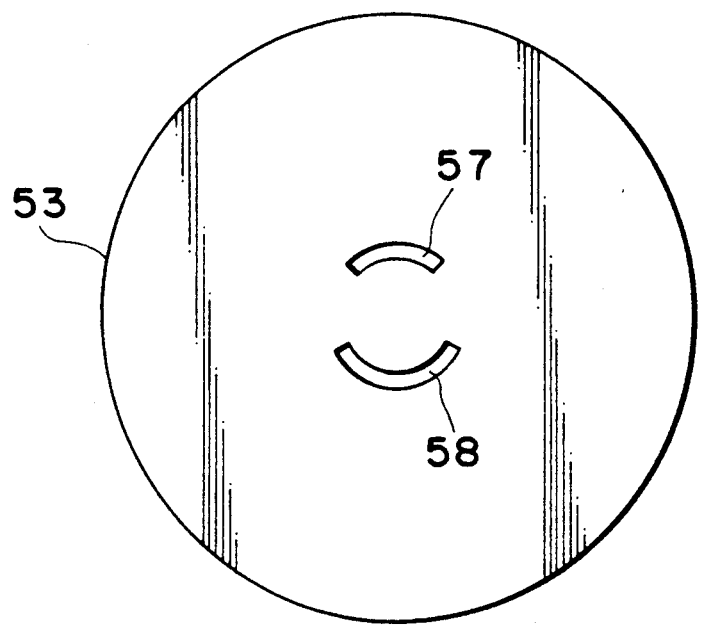
FIG. 8 is a schematic drawing showing a bottom view of a lid.

FIG. 7 is a plan view of the rotor 51 and the stator 52. Referring to FIG. 7, similarly to an ordinary step motor, the outer periphery of the rotor 51 is formed with a plurality of rectangular teeth and the inner circumference of the stator 52 is correspondingly formed with a plurality of rectangular teeth. Further, the stator 52 is wound with a solenoid 54. The rotor 51 is formed with two stopper pins 55, 56 and, as shown in FIG. 8, the lid 53 is formed with two arc-shaped grooves 57, 58 at positions corresponding to the stopper pins 55, 56. The groove 57 is adapted to engage with the stopper pin 55 formed in the rotor 51 and restrict the range within which the step motor 27 can move. The groove 58 is adapted to engage with the stopper pin 56 and the weight center of the rotor 51 can be positioned so as to agree with the rotation center by engaging the stopper pins 55, 56 with the grooves 57, 58 when the rotor 51 and the stator 52 is covered by the lid 53. Therefore, the angle of circumference obtained by viewing the opposite ends of the groove 58 from the center of the lid 53 is greater than that obtained by viewing the opposite ends of the groove 57. Thus, the grooves 57, 58 are formed so that the groove 57 exclusively determines the range over which the step motor 27 can move. In FIG. 8, when the rotor 51 rotates clockwise, the damping coefficient Dk becomes greater and the damping force characteristics become harder. On the other hand, when the rotor 51 rotates counterclockwise, the damping coefficient Dk becomes smaller and the damping force characteristics becomes softer. When a particular rectangular tooth of the rotor 51 is moved to a position opposite to the adjacent rectangular tooth of the stator 52, namely, when the step motor 27 is rotated by one step, the damping coefficient Dk is changed by one. Accordingly, when the stopper pin 55 is located at the right end of the groove 57 (the first reference position), the damping coefficient Dk is D10 and the shock absorber 1 produces the hardest damping force. On the other hand, the stopper pin 55 is located at the left end of the groove 57 (the second reference position), the damping coefficient Dk is D1 and the shock absorber 1 produces the softest damping force.

Figure 9:
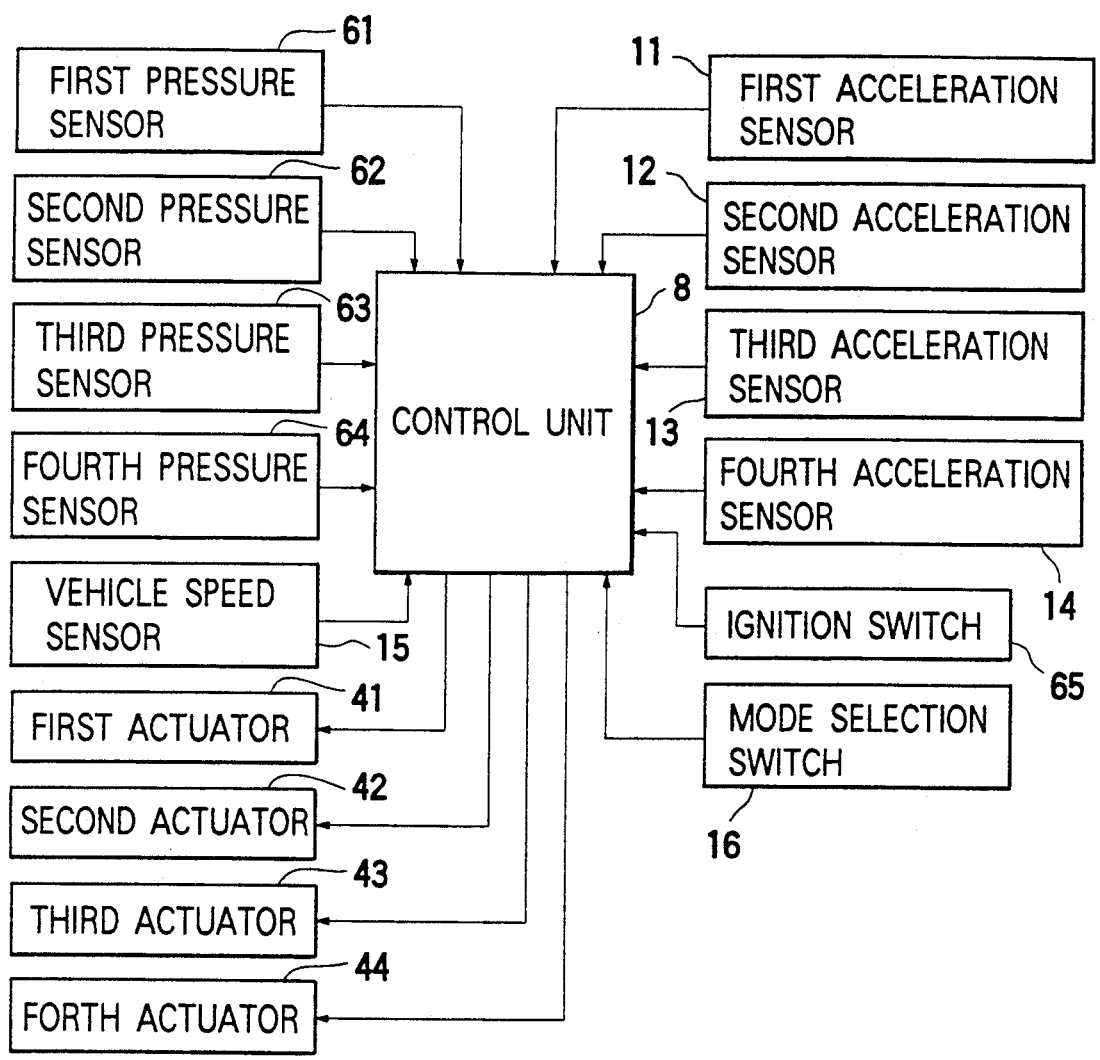
FIG. 9 is a block diagram of a control system of a suspension system for a vehicle which is an embodiment of the present invention.

FIG. 9 is a block diagram of the control system of the suspension apparatus for a vehicle which is an embodiment of the present invention.

Referring to FIG. 9, the control system of the suspension system comprises the control unit 8; a first pressure sensor 61, a second pressure sensor 62, a third pressure sensor 63 and a fourth pressure sensor 64 which are provided in the corresponding shock absorbers 1, 2, 3, 4 and adapted for detecting the damping forces "Fsi" ("i" being an integer of 1 to 4 for indicating the wheel) of the shock absorbers 1, 2, 3, 4 and outputting the damping force detection signals to the control unit 8; the first acceleration sensor 11, the second acceleration sensor 12, the third acceleration sensor 13 and the fourth acceleration sensor 14 for detecting the vertical acceleration "ai" of the sprung parts and outputting the vertical acceleration detecting signals to the control unit 8; the vehicle speed sensor 15 for detecting vehicle speed and outputting it to the control unit 8; and an ignition switch 65 for outputting "IG" signals which show whether the ignition switch 65 is on or off to the control unit 8 and the mode selection switch 16 for outputting mode signals to the control unit 8. The control unit 8 produces control signals based upon these input signals in accordance with the map or table stored therein and outputs them to the first actuator 41, the second actuator 42, the third actuator 43 and the fourth actuator 44, thereby to control the damping force characteristics of the shock absorbers 1, 2, 3, 4. The damping force "Fsi" assumes a continuous value and is defined to be positive when it acts upward on the sprung parts, namely, when the distance between the sprung parts and unsprung parts decreases, and to be negative when it acts downward on the sprung parts, namely, when the distance between the sprung parts and unsprung parts increases. The vertical acceleration of the sprung parts "ai" is defined to be positive when the direction thereof is upward and to be negative when the direction thereof is downward.

Figure 10:
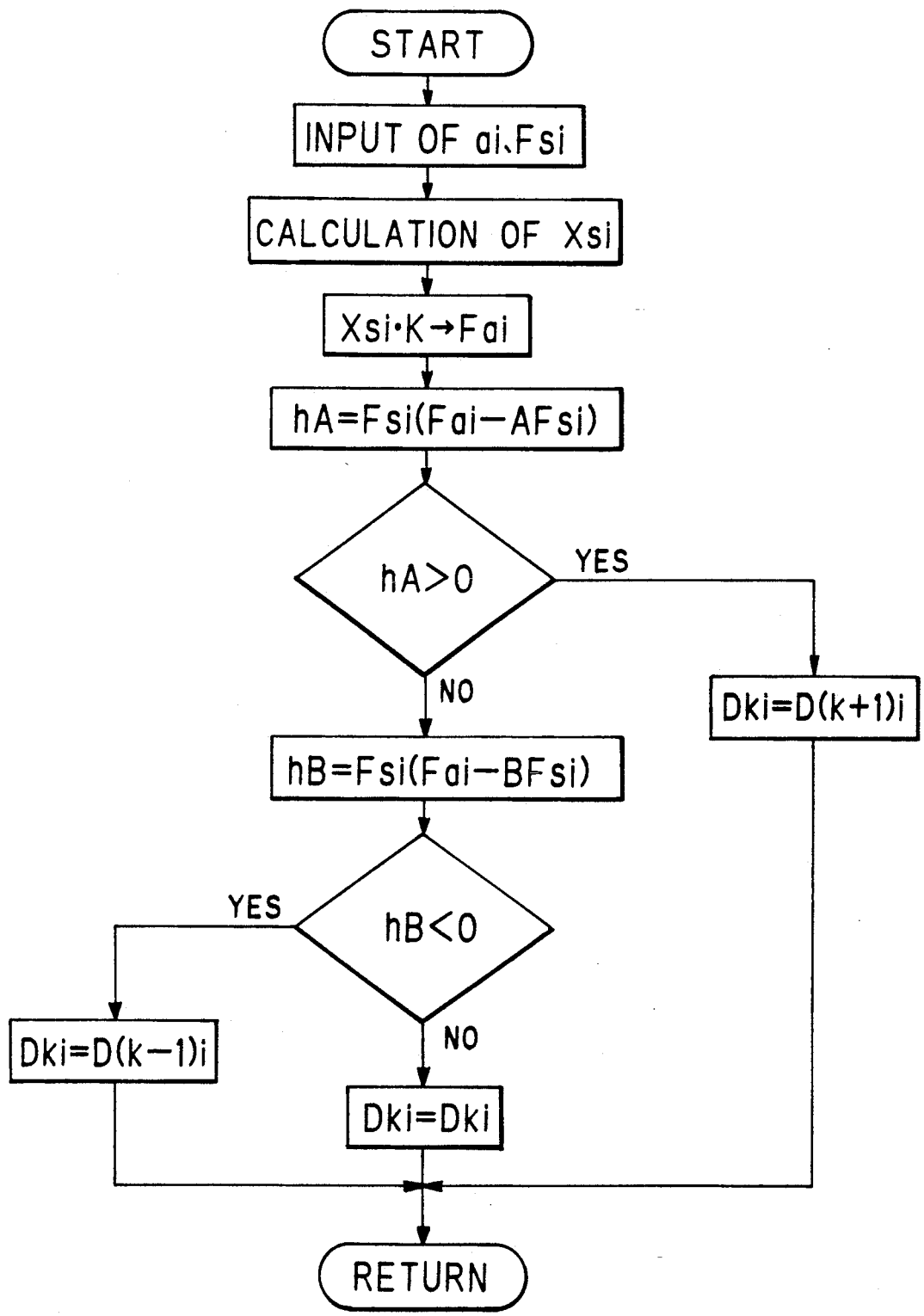
FIG. 10 is the flow chart of a basic routine for controlling damping force characteristics of the respective shock absorbers carried out by a control unit when a control mode is selected by operating a mode selection switch.

FIG. 10 is the flow chart of a basic routine for controlling the damping force characteristics of each shock absorber 1, 2, 3, 4 carried out by the control unit 8 when the mode selection switch 16 is set to the control mode.

Referring to FIG. 10, the control unit 8 receives the vertical acceleration "ai" of the sprung parts detected by the first acceleration sensor 11, the second acceleration sensor 12, the third acceleration sensor 13 and the fourth acceleration sensor 14 and the damping force "Fsi" detected by the first pressure sensor 61, the second pressure sensor 62, a third pressure sensor 63 and the fourth pressure sensor 64. The control unit 8 then integrates each vertical acceleration "ai", thereby to calculate the displacement speed Xsi of the sprung parts.

Further, the control unit 8 multiplies the thus calculated displacement speed Xsi of the sprung parts by a predetermined constant K, which is negative, thereby to calculate a sky-hook damping force "Fai", which is an ideal damping force.

Then, the control unit 8 calculates "hA" in accordance with the following formula (1) and judges whether or not the thus calculated "hA" is positive for each of the shock absorbers 1, 2, 3, 4.

$$hA = Fsi (Fai - AFsi)$$

When "hA" is positive in one of the shock absorbers 1, 2, 3, 4, the control unit 8 outputs control signals to the first actuator 41, the second actuator 42, the third actuator 43 and/or the fourth actuator 44 of the shock absorbers 1, 2, 3, 4 in which "hA" is positive and rotates the corresponding step motors 27 clockwise in FIG. 8 by one step, thereby to change the damping coefficient(s) Dki in the preceding cycle to D(k+1)i which is greater than the damping coefficient Dki in the preceding cycle by one so that the damping force characteristics becomes harder. On the contrary, when "hA" is not positive, the control unit 8 calculates "hB" in accordance with the following formula (2) and judges whether or not the thus calculated "hB" is negative for each of the shock absorbers 1, 2, 3, 4.

hB=Fsi (Fai−BFsi)

When "hB" is negative in one of the shock absorbers 1, 2, 3, 4, the control unit 8 outputs control signals to the first actuator 41, the second actuator 42, the third actuator 43 and/or the fourth actuator 44 of the shock absorbers 1, 2, 3, 4 in which "hB" is negative and rotates the corresponding step motors 27 counterclockwise in FIG. 8 by one step, thereby to change the damping coefficient(s) Dki in the preceding cycle to D(k−1)i, which is smaller than the damping coefficient Dki in the preceding cycle by one, so that the damping force characteristics becomes softer. On the contrary, when "hB" is not negative, the control unit 8 begins the next cycle without rotating any step motor 27 for changing the damping coefficients Dki, which are the damping coefficients in the preceding cycle.

"A" and "B" are threshold values for preventing the damping coefficient Dki from being frequently changed and preventing large noises, vibration, or response delay from occurring when the damping coefficient Dki is changed. From this viewpoint, "A" is normally set to be greater than 1 and "B" is normally set to be greater than zero and less than 1.

More specifically, when the signs of "Fsi" and "Fai" are the same, since "A" is set to be greater than 1, the sign of (Fai−AFsi) in the formula (1) tends to be different from that of Fsi in comparison with the case where Fsi is not multiplied by "A", whereby, since "hA" tends to be negative, the damping coefficient Dki is not frequently changed. Further, since "B" is set to be greater than zero and less than 1, the sign of (Fai−BFsi) in the formula (2) tends to be the same as that of Fsi in comparison with the case where Fsi is not multiplied by "B", whereby since "hB" tends to be negative, the damping coefficient Dki is not so frequently changed.

On the contrary, when the signs of "Fsi" and "Fai" are different from each other, since it is impossible to make the actual damping force Fsi agree with the skyhook damping force Fai (the ideal damping force), it is desirable for bringing Fsi close to Fai to put the damping coefficient Dki close to zero, namely, to make the damping coefficient Dki softer. Accordingly, in this embodiment, when the signs of "Fsi" and "Fai" are different from each other, since both "hA" and "hB" are negative, whereby the damping coefficient Dki is changed to D(k−1)i which is smaller than the damping coefficient Dki in the preceding cycle by one, namely, softer, the above mentioned requirement can be met.

Figure 11:
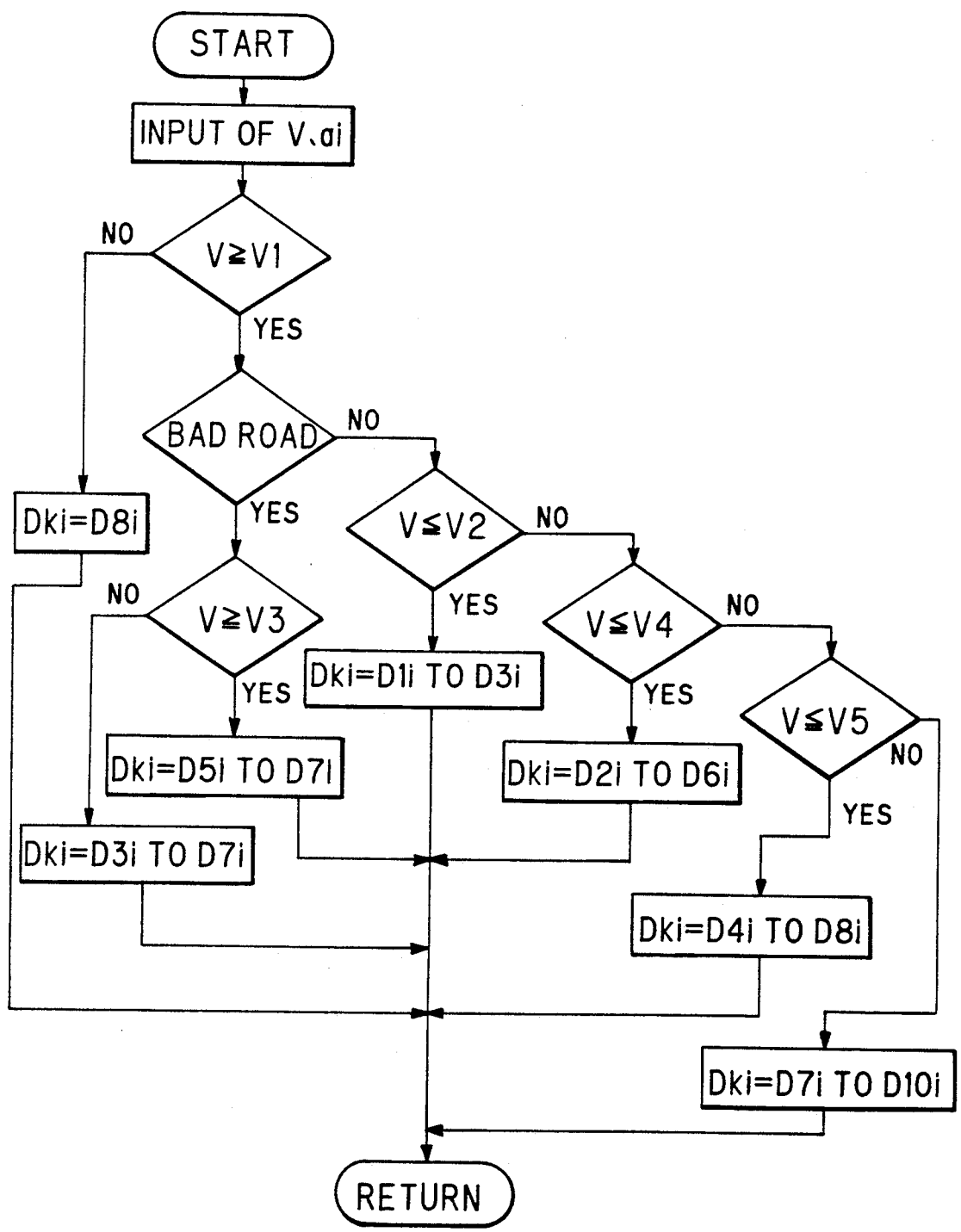
FIG. 11 is a flow chart of routine for selecting a damping coefficient in accordance with driving conditions when control mode is selected by operating a mode selection switch.

FIG. 11 is the flow chart of a routine for selecting the damping coefficient in accordance with driving conditions when the mode selection switch 16 is set to the control mode. This routine is preferentially applied to the basic routine shown in FIG. 10. More specifically, in the basic routine, although an attempt is made, by using the threshold values "A" and "B", to prevent the damping coefficient Dki from being frequently changed and prevent large noises, vibration, and/or response delay from occurring when the damping coefficient Dki is changed, since the damping coefficient Dki is changed based upon only the signs of "hA" and "hB", some problem of the damping coefficient being frequently changed still remains. Therefore, for solving this problem, the range within which the damping coefficient Dki can be changed is restricted in accordance with driving conditions based upon the routine for selecting the damping coefficient. As a consequence, the damping coefficient Dki can be changed by the basic routine shown in FIG. 10 within the range of the damping coefficient determined by the routine for selecting the damping coefficient shown in FIG. 11.

Referring to FIG. 11, the control unit 8 receives the vehicle speed V detected by the vehicle speed sensor 15 and the vertical acceleration "ai" of the sprung parts detected by the first acceleration sensor 11, the second acceleration sensor 12, the third acceleration sensor 13 and the fourth acceleration sensor 14.

The control unit 8 then judges whether the vehicle speed V is equal to or lower than a first predetermined speed V1 which is extremely low, for instance, 3 km/h.

When the vehicle speed V is not greater than the first predetermined speed V1, since the vehicle speed is extremely low, the control unit 8 fixes the damping coefficient Dki at D8i for preventing the vehicle from squatting and diving during braking, so that the damping force characteristics of the shock absorbers 1, 2, 3, 4 become hard. As a result, the damping force characteristics are not changed based upon the basic routine shown in FIG. 10.

On the contrary, when the vehicle speed is greater than the first predetermined speed V1, the control unit 8 further judges whether or not the absolute value of the vertical acceleration "ai" of the sprung parts exceeds a predetermined value "aio".

When the control unit 8 judges that the absolute value of the vertical acceleration "ai" of the sprung parts exceeds a predetermined value "aio", since this can be considered to mean that the vehicle is being driven on a bad road, the control unit 8 further judges whether the vehicle speed V is equal to or greater than a third predetermined speed V3, for instance, 50 km/h.

When the control unit 8 judges that the vehicle speed V is not lower than the third predetermined speed V3, since it is desirable to emphasize the driving stability, it determines the range over which the damping coefficient Dki can be changed to be D5i to D7i for controlling the damping force characteristics within a relatively hard range. As a result, since the damping coefficient D5i becomes the lower limit value in the basic routine shown in FIG. 10, even if the damping coefficient Dki should be made softer, namely, smaller than the damping coefficient D5i in the basic routine, the damping coefficient Dki is held to be D5i. On the other hand, since the damping coefficient D7i becomes the upper limit value in the basic routine shown in FIG. 10, even if the damping coefficient Dki should be made harder, namely, greater than the damping coefficient D7i in the basic routine, the damping coefficient Dki is held to be D7i.

On the contrary, when the control unit 8 judges that the vehicle speed V is lower than the third predetermined speed V3, since it is possible to improve the riding comfort and the driving stability simultaneously, it determines the range within which the damping coefficient Dki can be changed to be D3i to D7i for controlling the damping force characteristic between a relatively soft one and a relatively hard one. As a result, since the damping coefficient D3i becomes the lower limit value in the basic routine shown in FIG. 10, even if the damping coefficient Dki should be made softer, namely, smaller than the damping coefficient D3i in the basic routine, the damping coefficient Dki is held to be D3i. On the other hand, since the damping coefficient D7i becomes the upper limit value in the basic routine shown in FIG. 10, even if the damping coefficient Dki should be made harder, namely, greater than the damping coefficient D7i in the basic routine, the damping coefficient Dki is held to be D7i.

On the contrary, when the control unit 8 judges that the absolute value of the vertical acceleration "ai" of the sprung parts does not exceed a predetermined value "aio", since this can be considered to mean that the vehicle is being driven on a good road, the control unit 8 further judges whether the vehicle speed V is equal to or lower than a second predetermined speed V2, for instance, 30 km/h.

When the control unit 8 judges that the vehicle speed V is not greater than the second predetermined speed V2, since the vehicle speed is low and it is desirable to emphasize the riding comfort, it determines the range over which the damping coefficient Dki can be changed to be D1i to D3i for controlling the damping force characteristics within a relatively soft range. As a result, since the damping coefficient D3i becomes the upper limit value in the basic routine shown in FIG. 10, even if the damping coefficient Dki should be made harder, namely, greater than the damping coefficient D3i in the basic routine, the damping coefficient Dki is held to be D3i. On the other hand, although the damping coefficient D1i becomes the lower limit value in the basic routine shown in FIG. 10, since the damping coefficient D1i is the softest, the control of the damping coefficient Dki is not restricted in the basic routine as far as the lower limit value is concerned.

On the contrary, when the control unit 8 judges that the vehicle speed V is greater than the second predetermined speed V2, it further judges whether the vehicle speed V is equal to or lower than a fourth predetermined speed V4, for instance, 60 km/h.

When the control unit 8 judges that the vehicle speed V is not greater than the fourth predetermined speed V4, since it is possible to improve the riding comfort and the driving stability simultaneously, it determines the range over which the damping coefficient Dki can be changed to be D2i to D6i for controlling the damping force characteristics between a relatively soft one and a relatively hard one. As a result, since the damping coefficient D2i becomes the lower limit value in the basic routine shown in FIG. 10, even if the damping coefficient Dki should be made softer, namely, smaller than the damping coefficient D2i in the basic routine, the damping coefficient Dki is held to be D2i. On the other hand, since the damping coefficient D6i becomes the upper limit value in the basic routine shown in FIG. 10, even if the damping coefficient Dki should be made harder, namely, greater than the damping coefficient D6i in the basic routine, the damping coefficient Dki is held to be D6i.

On the contrary, when the control unit 8 judges that the vehicle speed V is greater than the fourth predetermined speed V4, it further judges whether the vehicle speed V is equal to or lower than a fifth predetermined speed V5, for instance, 80 km/h.

When the control unit 8 judges that the vehicle speed V is not greater than the fifth predetermined speed V5, it determines the range over which the damping coefficient Dki can be changed to be D4i to D8i for improving the riding comfort and the driving stability by controlling the damping force characteristics to be relatively hard. As a result, since the damping coefficient D4i becomes the lower limit value in the basic routine shown in FIG. 10, even if the damping coefficient Dki should be made softer, namely, smaller than the damping coefficient D4i in the basic routine, the damping coefficient Dki is held to be D4i. On the other hand, since the damping coefficient D8i becomes the upper limit value in the basic routine shown in FIG. 10, even if the damping coefficient Dki should be made harder, namely, greater than the damping coefficient D8i in the basic routine, the damping coefficient Dki is held to be D8i.

On the contrary, when the control unit 8 judges that the vehicle speed V is greater than the fifth predetermined speed V5, since the vehicle is being driven at a high speed and it is desirable to emphasize the driving stability, it determines the range over which the damping coefficient Dki can be changed to be D7i to D10i for controlling the damping force characteristics to be hard. As a result, since the damping coefficient D7i becomes the lower limit value in the basic routine shown in FIG. 10, even if the damping coefficient Dki should be made softer, namely, smaller than the damping coefficient D7i in the basic routine, the damping coefficient Dki is held to be D7i. On the other hand, although the damping coefficient D10i becomes the upper limit value in the basic routine shown in FIG. 10, since the damping coefficient D10i is the hardest, the control of the damping coefficient Dki is not restricted in the basic routine as far as the upper limit value is concerned.

Figure 12:
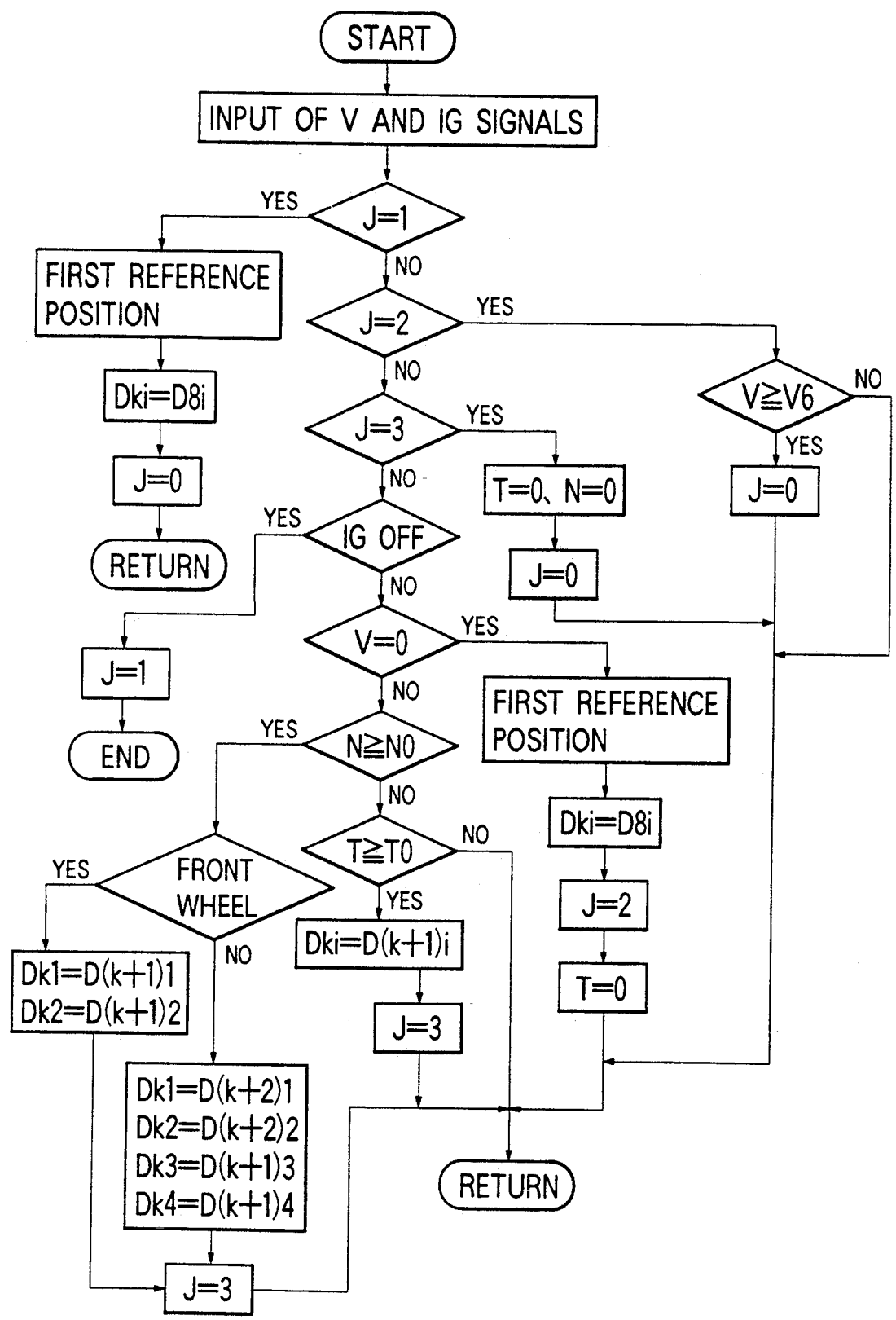
FIG. 12 is a flow chart for adjusting step motors.

FIG. 12 is a flow chart for adjusting a step motor 27 in the case where the step motor 27 is thrown out of synchronism. Even if the range over which the damping coefficient Dki can be changed is restricted in accordance with driving conditions by the routine for selecting the damping coefficient Dki shown in FIG. 11, after a predetermined time period has passed, or the damping coefficient Dki has been changed between great values and small values a predetermined number of times or more, the step motors 27 may be thrown out of synchronism and, as a result, a damping coefficient Dki other than that intended by the control unit 8 may be selected. In such cases, a desired damping force cannot be produced, even if the range over which the damping coefficient Dki can be changed is restricted in accordance with the driving conditions by the routine for selecting the damping coefficient Dki shown in FIG. 11 and the damping force characteristics are controlled by the basic routine shown in FIG. 10. Therefore, according to this embodiment, the step motors 27 are adjusted by the flow chart shown in FIG. 12.

Referring to FIG. 12, the control unit 8 receives the vehicle speed detection signal from the vehicle speed sensor 15 and the IG signals from the ignition switch 65.

The control unit 8 then judges whether or not a flag J which is set to 1 when the ignition switch 65 is turned off is equal to 1. Since the flag J is 1 at the beginning of the adjustment of the step motors 27, the result is YES. Under this driving condition, since the damping force characteristics of the shock absorbers 1, 2, 3, 4 should be controlled to be hard for preventing the vehicle from squatting and diving during braking, the control unit 8 rotates each step motor 27 clockwise in FIG. 8 until the stopper pin 55 comes into abutment against the right end portion of the groove 57 and locates it at the first reference position where the hardest damping force is produced. Then, in accordance with the routine for selecting the damping coefficient Dki shown in FIG. 11, the control unit 8 rotates each step motor 27 and, therefore, each shaft 25, so as to select the desired damping coefficient Dki. Since the vehicle speed V is lower than the first predetermined speed V1 at the beginning of the adjustment of the step motor 27, as shown in FIG. 11, the damping coefficient Dki is fixed to be D8i. The control unit 8 then sets the flag to zero and begins the next cycle.

In the next cycle, the control unit first judges whether or not the flag J is equal to 1. Since the flag J is zero, the result of this judgment is NO. Then, the control unit 8 judges whether or not the flag J is equal to 2 and further whether or not the flag J is equal to 3. The result in each case is NO. Further, the control unit 8 judges whether or not the ignition switch 65 is off. Since the engine is running, the result of this judgment is also NO.

Then, the control unit 8 judges, based upon the vehicle speed detection signal input from the vehicle speed sensor 15, whether or not the vehicle speed V equals zero, that is, whether or not the vehicle is stopped.

When the control unit 8 judges that the vehicle speed is zero and that the vehicle is stopped, it rotates each step motor 27 clockwise in FIG. 8 until the stopper pin 55 comes into abutment against the right end portion of the groove 57 and locates it at the first reference position where the hardest damping force is produced. Then, in accordance with the routine for selecting the damping coefficient Dki shown in FIG. 11, the control unit 8 rotates the step motor 27 and, therefore, the shaft 25, so as to select the desired damping coefficient Dki. Since the vehicle speed V is zero and lower than the first predetermined speed V1 at the beginning of the adjustment of the step motor 27, as shown in FIG. 11, the damping coefficient Dki is set to be D8i. Then, the control unit 8 sets the flag J to 2 and begins the next cycle.

In the next cycle, the control unit 8 judges whether or not the flag J is equal to 2 and since the flag is set to 2, the result of the judgment is YES. Then, the control unit 8 judges whether the vehicle speed V is equal to or greater than a sixth predetermined speed V6, for example, 20 km/h.

When the result is NO, since the vehicle is being driven at an extremely low speed, it is considered that the damping coefficient Dki will be changed slowly. Under this condition, since there is no risk of the step motors 27 being thrown out of synchronism and the step motors 27 have already been adjusted, the control unit 8 begins the next cycle without taking any action.

On the contrary, when the result is YES, since the vehicle speed V is not extremely low and the damping coefficient Dki changes quickly, although the step motors 27 have already been adjusted, there is some risk of the step motors 27 being thrown out of synchronism again. Therefore, the control unit 8 sets the flag J to zero and begins the next cycle.

In the next cycle, the control unit 8 judges again whether or not the vehicle speed is zero.

When the control unit judges that the vehicle speed V is zero, as explained above, it rotates each step motor 27 clockwise in FIG. 8 until the stopper pin 55 comes into abutment against the right end portion of the groove 57 and locates it at the first reference position where the hardest damping force is produced. Then, in accordance with the routine for selecting the damping coefficient Dki shown in FIG. 11, the control unit 8 rotates each step motor 27 and, therefore, each shaft 25, so as to select the desired damping coefficient Dki.

Since the vehicle speed V is zero and lower than the first predetermined speed V1 at the beginning of the adjustment of the step motors 27, as shown in FIG. 11, the damping coefficient Dki is fixed at D8i. Then, the control unit 8 sets the flag J to 2 and begins the next cycle.

On the contrary, when the control unit 8 judges that the vehicle speed V is not zero, since the vehicle is being driven and the damping coefficients Dki may have been changed between great values and small values quickly and frequently, the step motors 27 may have been thrown out of synchronism. Therefore, the control unit 8 judges whether the damping coefficient Dki has been changed between great values and small values a predetermined times N0, for example, 100 times or more. This judgment can be easily carried out by providing a counter in the control unit 8, which counts every time the damping coefficient Dki is changed, and storing the number of times in a memory.

When the control unit 8 judges that the number of times N that the damping coefficient Dki has been changed between great values and small values is equal to or greater than the predetermined number N0, it further judges whether the damping coefficient Dki has been changed between great values and small values N0 times or more in only the first actuator 41 of the shock absorber 1 associated with the front left wheel and/or the second actuator 42 of the shock absorber 2 associated with the front right wheel.

When the result is YES, in other words, when the damping coefficient Dki has been changed N0 times or more in only the first actuator 41 of the shock absorber 1 associated with the front left wheel and/or the second actuator 42 of the shock absorber 2 associated with the front right wheel, since it is desirable to emphasize the driving stability, the control unit 8 rotates the step motors 27 of the shock absorbers 1, 2 associated with front wheels clockwise in FIG. 8 by one step, thereby changing the damping coefficients Dk1 and Dk2 of the shock absorbers 1, 2 associated with front wheels to D(k+1)1 and D(k+1)2 respectively so that the damping force characteristics become harder. Then, the control unit 8 sets the flag J to 3 and begins the next cycle. The damping force characteristics of both shock absorbers 1, 2 associated with the front wheels are controlled to be harder, because the steering characteristics are undesirably changed if the damping coefficient of only one of the shock absorbers 1, 2 is changed.

On the contrary, when the control unit 8 judges that the damping coefficient Dki has been changed between great values and small values N0 times or more in the third actuator 43 of the shock absorber 3 associated with the rear left wheel or the fourth actuator 44 of the shock absorber 4 associated with the rear right wheel, similarly to the above, it is desirable to emphasize the driving stability and, therefore, it is necessary to make the damping force characteristics harder. However, if only the damping force characteristics of the shock absorbers 3, 4 associated with the rear wheels should be hard, since there would be some risk of oversteering, the control unit 8 rotates the step motors 27 of the shock absorbers 1, 2 associated with the front wheels clockwise in FIG. 8 by two steps, thereby changing the damping coefficients Dk1 and Dk2 of the shock absorbers 1, 2 to D(k+2)1 and D(k+2)2 respectively and further rotates the step motors 27 of the shock absorbers 3, 4 associated with the rear wheels clockwise in FIG. 8 by one step, thereby changing the damping coefficients Dk3 and Dk4 of the shock absorbers 3, 4 to D(k+1)3 and D(k+1)4 respectively. Then, the control unit 8 begins the next cycle.

On the contrary, when the control unit 8 judges that the number of times N that the damping coefficient Dki has been changed between great values and small values is less than the predetermined number N0, it further judges whether a time period T during which the flag J has been being held at zero is equal to or greater than a predetermined time period T0.

When the result of this judgment is YES, this means that after the engine was started and the step motors 27 were adjusted, the flag J was set to zero because the vehicle was driven at speed equal to or greater than the sixth predetermined speed V6 and, then, the predetermined time period T0 passed without any change in the flag J. In other words, this means that the step motors 27 have not been adjusted for the predetermined time period T0 and that there is a high possibility of the step motors having been thrown out of synchronism. Therefore, since it is necessary to adjust the step motors 27, the control unit 8 emphasizes the driving stability and rotates all of the step motors 27 clockwise in FIG. 8 by one step, thereby changing the damping coefficients Dk1, Dk2, Dk3 and Dk4 to D(k+1)1, D(k+1)2. D(k+1)3 and D(k+1)4 so that the damping characteristics of the shock absorbers 1, 2, 3, 4 are made harder. Then, the control unit 8 sets the flag J to 3 and begins the next cycle.

On the contrary, when the control unit 8 judges that the time period T for which the flag J has been held at zero is less than the predetermined time period T0, since it is unnecessary to adjust any step motor 27, the control unit 8 begins the next cycle.

Since the flag J was set to 3 when the step motors 27 were adjusted, the control unit 8 resets both the number of times N and the time period T to zero in the next cycle and since the step motors 27 have already been adjusted, the control unit 8 further sets the flag J to zero and begins the next cycle.

According to this embodiment, since the step motors 27 are adjusted every time the vehicle is stopped and the step motors 27 are adjusted when the damping coefficient Dki has been changed between great values and small values a predetermined times or more and a predetermined time period T0 has passed since the step motors 27 were adjusted, it is possible to control the damping force characteristics of the shock absorbers 1, 2, 3, 4 in a desired manner.

According to the present invention, it is possible to provide a suspension system for a vehicle which can prevent driving stability from being lowered even when at least one of the step motors is thrown out of synchronism.

The present invention has thus been shown and described with reference to a specific embodiment. However, it should be noted that the present invention is in no way limited to the details of the described arrangements but changes and modifications may be made without departing from the scope of the appended claims.

For example, in the above described embodiment, although the step motors 27 are adjusted when the damping coefficient Dki has been changed between great values and small values a predetermined times or more and a predetermined time period T0 has passed since the step motors 27 were adjusted, the step motors 27 may be adjusted only when the damping coefficient Dki has been changed between great values and small values a predetermined times or more, or only when a predetermined time period T0 has passed since the step motors 27 were adjusted.

Further, in the above described embodiment, although when the damping coefficient Dki has been changed in the shock absorbers 3, 4 associated with the rear wheels N0 times or more, not only the step motors 27 of the shock absorbers 3, 4 associated with the rear wheels but also the step motors 27 of the shock absorbers 1, 2 associated with the front wheels are adjusted, if there is no risk of oversteering when only the step motors 27 of the shock absorbers 3, 4 associated with the rear wheels are adjusted, it is sufficient to adjust only the step motors 27 of the shock absorbers 3, 4 associated with the rear wheels.

Furthermore, in the above described embodiment, although the threshold values "A" and "B" are determined so that "A" is greater than 1 and that "B" is greater than zero and less than 1, it is not absolutely necessary to set the threshold values "A" and "B" in this manner and it is sufficient for "A" to be greater than "B". However, from the viewpoint of maximizing the driving stability, it is preferable to determine the threshold values "A" and "B" so that "A" is greater than 1, that "A" is greater than "B" and that "B" is greater than zero.

Moreover, in the above described embodiment, although the rotor 51 of the step motor 27 is formed with two stopper pins 55, 56 and the lid 53 of the step motor 27 is formed with the grooves 57, 58 for engaging with the stopper pins 55, 56, the lid 53 of the step motor 27 may be formed with two stopper pins 55, 56 and the rotor 51 of the step motor 27 may be formed with the grooves 57, 58 for engaging with the stopper pins 55, 56. Further, one of the stopper pins 55, 56 may be formed in the rotor 51 of the step motor 27, the other may be formed in the lid 53 of the step motor 27, the lid may be formed with a groove for engaging with the stopper pin formed in the rotor 51 and the rotor may be formed with a groove for engaging with the stopper pin formed in the lid 53. In addition, a positioning means for positioning the step motor 27 at the first reference position and the second reference position may be constituted by other means than the stopper pins 55, 56 and the grooves 57, 58.

We claim:

1. A suspension system for a vehicle comprising:
    shock absorbers, each of said shock absorbers provided so as to be associated with one wheel of the vehicle and between sprung parts and unsprung parts of the vehicle,
    step motors for changing damping force characteristics of one of the shock absorbers in steps by open loop control, and
    control means for outputting control signals to the step motors every predetermined time interval so as to make the damping force characteristics of said shock absorbers harder.

2. A suspension system for a vehicle comprising:
    shock absorbers, each of said shock absorbers provided so as to be associated with one wheel of the vehicle and between sprung parts and unsprung parts of the vehicle,
    step motors for changing damping force characteristics of one of the shock absorbers in steps by open loop control, and control means for outputting control signals to the step motors so as to make the damping force characteristics of said shock absorbers harder when the damping force characteristics of said shock absorbers have been changed between soft stages and hard stages at least a predetermined number of times.

3. A suspension system for a vehicle in accordance with claim 1 wherein said control means further outputs control signals so as to make the damping force characteristics of said shock absorbers harder when the damping force characteristics of said shock absorbers have been changed between soft stages at least and hard stages a predetermined number of times.

4. A suspension system for a vehicle in accordance with claim 1 wherein said control means outputs control signals so as to change the damping force characteristics of the shock absorbers associated with right and left wheels of the vehicle when the damping force characteristics are made harder.

5. A suspension system for a vehicle in accordance with claim 1 wherein said control means outputs control signals so as to change the damping force characteristics of the shock absorbers associated with front wheels of the vehicle when the damping force characteristics of the shock absorbers associated with rear wheels of the vehicle are made harder.

6. A suspension system for a vehicle in accordance with claim 1 wherein a range within which the damping force characteristics can be changed is set to be harder when a vehicle speed is lower than a first predetermined speed.

7. A suspension system for a vehicle in accordance with claim 1 wherein a range within which the damping force characteristics can be changed is set to be harder when a vehicle speed is greater than a second predetermined speed.

* * * * *